US008958174B1

(12) United States Patent
Shiraishi et al.

(10) Patent No.: US 8,958,174 B1

(45) Date of Patent: Feb. 17, 2015

(54) SPINDLE MOTOR AND DISK DRIVE APPARATUS

(71) Applicant: Nidec Corporation, Kyoto (JP)

(72) Inventors: Masahiro Shiraishi, Kyoto (JP); Tsuchitsugu Watanabe, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 14/335,444

(22) Filed: Jul. 18, 2014

Related U.S. Application Data

(60) Provisional application No. 61/861,052, filed on Aug. 1, 2013.

(51) Int. Cl.
*G11B 17/02* (2006.01)

(52) U.S. Cl.
USPC .......................................................... 360/99.11

(58) Field of Classification Search
USPC .......................................................... 360/99.11
See application file for complete search history.

(56) References Cited

U.S. PATENT DOCUMENTS 7,239,477 B2 * 7/2007 Aiello et al. ............... 360/99.08
8,315,012 B2 * 11/2012 Himeno et al. ............ 360/99.08
8,786,982 B1 * 7/2014 Kodama et al. ............ 360/99.08
2006/0097592 A1 5/2006 Sumi
2008/0218019 A1 9/2008 Sumi
2010/0033870 A1 2/2010 Sekii et al.
2011/0235210 A1 * 9/2011 Himeno et al. ............ 360/99.08

FOREIGN PATENT DOCUMENTS

JP 2005-155912 A 6/2005
JP 2006-250193 A 9/2006
JP 2010-190426 A 9/2010
WO 2009/001960 A1 12/2008

* cited by examiner

*Primary Examiner* — Mark Blouin

(74) *Attorney, Agent, or Firm* — Keating & Bennett, LLP

(57) ABSTRACT

A first capillary seal portion is positioned on a radially outer side of a bearing portion. A second capillary seal portion is positioned higher in an axial direction than the bearing portion and further on radially inner side than the first capillary seal portion. A seal cap covers a portion of an opening of the first capillary seal portion and a portion of an opening of the second capillary seal portion. The maximum width of a first gap between the outer circumferential surface of the shaft and an inner circumferential surface of the seal cap in a radial direction and the maximum width of a second gap between an upper surface of the sleeve portion and a lower surface of the seal cap in an axial direction is smaller than the maximum width of the opening of the first capillary seal portion.

25 Claims, 10 Drawing Sheets

SPINDLE MOTOR AND DISK DRIVE APPARATUS

BACKGROUND OF THE INVENTION

1. Field of the Invention

The present invention relates to a spindle motor for a disk drive apparatus.

2. Description of the Related Art

In the related art, spindle motors for disk drive apparatuses that include bearing mechanisms which use fluid dynamic pressure are used. In such a bearing mechanism, a shaft is supported by a sleeve via a lubricant. The bearing mechanism achieves low noise in this manner. In the bearing mechanism disclosed in JP-A-2005-155912, a side surface of an inner circumferential surface of a hole portion of a cover member is chamfered and is allowed to face an outer circumferential surface of a shaft such that a first tapered seal portion, which is a tapered seal on an inner side, is formed and a second tapered seal portion, which is a tapered seal portion on an outer side, is formed between an outer circumferential side surface of the cover member and an inner circumferential surface of a housing. The bearing mechanism described above discloses a technique for holding the lubricant, which is used in a fluid dynamic pressure bearing mechanism, with the first tapered seal portion and the second tapered seal portion while sequentially circulating the lubricant along an inner side surface, a lower surface, an outer side surface, and an upper surface of a sleeve.

In the bearing mechanism described above, the surface area of a liquid surface of the lubricant that is in contact with outside air increases since the lubricant is held by the two tapered seal portions, which causes the lubricant to evaporate in quantity. When the lubricant evaporates, the lubricant becomes absent between the shaft and the sleeve to cause the shaft and the sleeve to come into contact with each other and cause problems such as wear. Accordingly, a structure suppressing the evaporation of the lubricant is required.

SUMMARY OF THE INVENTION

According to a preferred embodiment of the present invention, there is provided a spindle motor that includes a stationary portion and a rotating portion. The stationary portion includes a stator. The rotating portion includes a rotor magnet, and is rotatably supported via a lubricant by the stationary portion. The stationary portion includes a sleeve portion and a seal cap. The sleeve portion is positioned on a radially outer side of a shaft. The seal cap includes an inner circumferential surface that defines a hole through which the shaft passes, and covers at least an upper surface of the sleeve portion. The rotating portion includes a shaft. An outer circumferential surface of the shaft and an inner circumferential surface of the sleeve portion face each other with the lubricant provided therebetween. At least a portion of the outer circumferential surface of the shaft or the inner circumferential surface of the sleeve portion constitutes a bearing portion. The stationary portion includes a first capillary seal portion and a second capillary seal portion. The first capillary seal portion is positioned on a radially outer side of the bearing portion. The second capillary seal portion is positioned on a further upper side than the bearing portion and on a further radially inner side than the first capillary seal portion. The lubricant is continuously interposed in the bearing portion, the first capillary seal portion, and the second capillary seal portion. The seal cap covers a portion of an opening of the first capillary seal portion and a portion of an opening of the second capillary seal portion. The maximum width of a first gap between the outer circumferential surface of the shaft and the inner circumferential surface of the seal cap in a radial direction is smaller than the maximum width of the opening of the first capillary seal portion. The maximum width of a second gap between the upper surface of the sleeve portion and a lower surface of the seal cap in an axial direction is smaller than the maximum width of the opening of the first capillary seal portion. In this manner, evaporation of the lubricant can be minimized or suppressed.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

In the following description, an upper side in a direction of a central axis of a motor is simply referred to as an "upper side," and a lower side in the direction of the central axis of the motor is simply referred to as a "lower side." An up-down direction does not mean a positional relationship or direction at a time of incorporation into actual equipment. In addition, a direction that is parallel with the central axis and a direction that is substantially parallel with the central axis are referred to as an "axial direction," a radial direction about the central axis is simply referred to as a "radial direction," and a circumferential direction about the central axis is simply referred to as a "circumferential direction."

Figure 1:
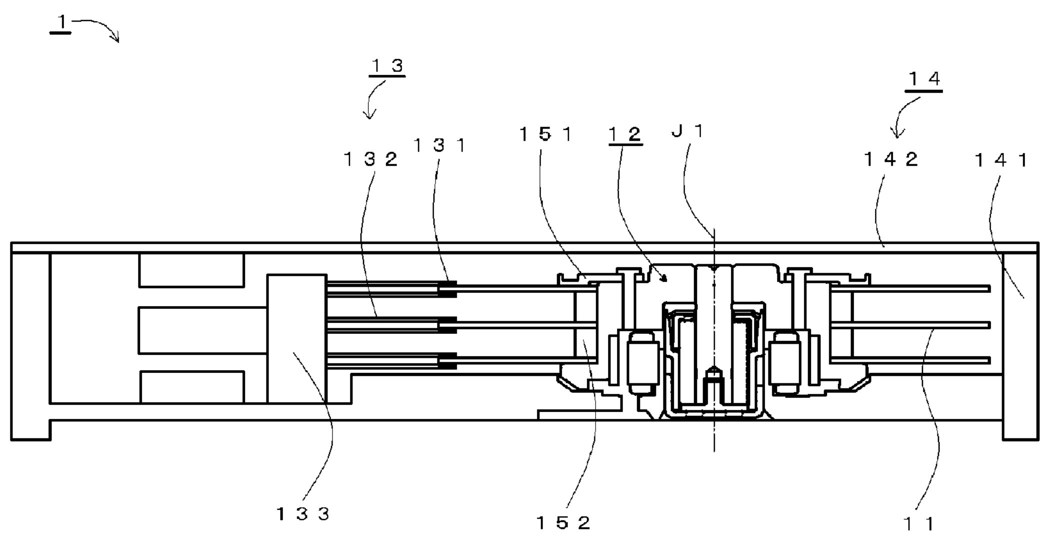
FIG. 1 is a schematic cross-sectional view of a disk drive apparatus according to a preferred embodiment of the present invention.

FIG. 1 is a schematic cross-sectional view of a disk drive apparatus 1 that includes a spindle motor (hereinafter, simply referred to as a "motor") according to a preferred embodiment of the present invention. The disk drive apparatus 1 is a so-called hard disk drive apparatus. The disk drive apparatus 1 preferably includes, for example, three disks 11, a motor 12, an access unit 13, and a housing 14. The motor 12 rotates the disk 11, which records information, about a central axis J1. The access unit 13 performs reading and writing of information on the disk 11. The access unit 13 may perform at least one of the reading and the writing of the information on the disk 11.

The housing 14 preferably includes a cup-shaped or substantially cup-shaped lower housing member 141, and a plate-shaped upper plate member 142. The disk 11, the motor 12, and the access unit 13 are accommodated inside the lower housing member 141. The upper plate member 142 is fitted into the lower housing member 141 to define the housing 14. It is preferable that an internal space of the disk drive apparatus 1 be a clean space with no, or only an extremely small amount of, dirt and dust. In this preferred embodiment, the disk drive apparatus 1 is preferably filled with air. The disk drive apparatus 1 may alternatively be filled with helium gas, hydrogen gas, nitrogen gas, etc., if so desired. In addition, the disk drive apparatus 1 may be filled with gas in which one or more of these gases are mixed with air.

The three disks 11 are preferably fixed to the motor 12 by a clamper 151 and a spacer 152. The three disks 11 are arranged at regular intervals in the central axis J1 direction of the motor 12 and are fixed. The access unit 13 preferably includes six heads 131, six arms 132, and a head moving mechanism 133. The head 131 performs the reading and the writing of the information close to the disk 11. The head 131 may perform at least one of the reading and the writing of the information. The arm 132 supports the head 131. The head moving mechanism 133 relatively moves the head 131 with respect to the disk 11 by moving the arm 132. By using this configuration, the head 131 is able to access a required position of the disk 11 in a state where the head 131 is close to the rotating disk 11. The number of the disks 11 is not limited to three, and the number of the disk 11 may be one or two or more.

Figure 2:
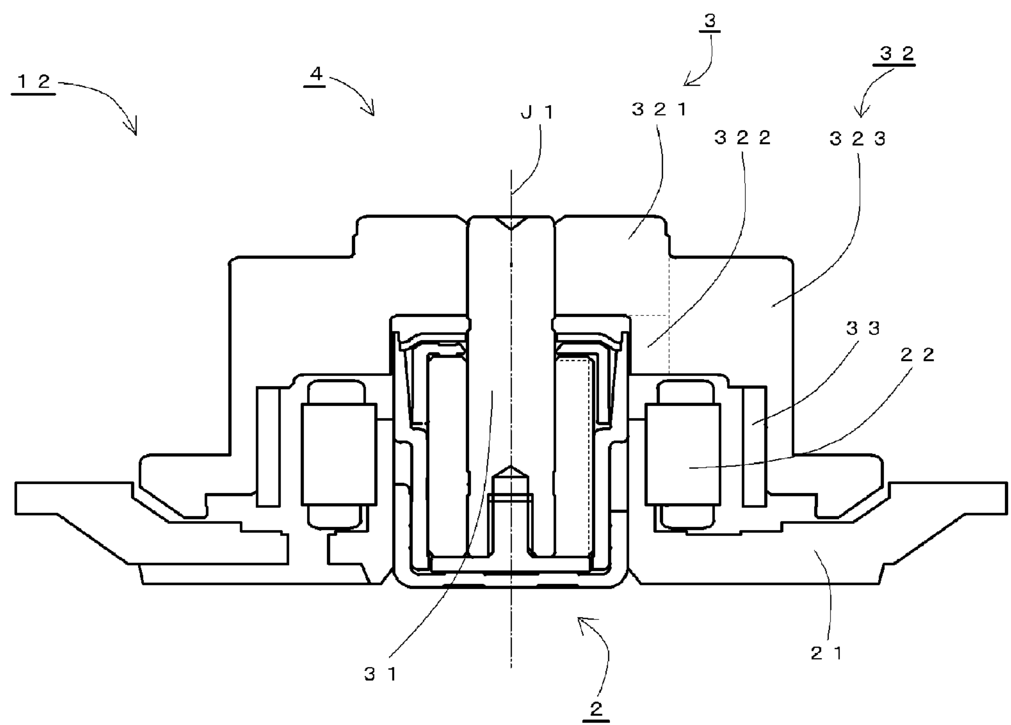
FIG. 2 is a schematic cross-sectional view of a spindle motor according to the preferred embodiment of the present invention.

FIG. 2 is a schematic cross-sectional view of a spindle motor according to the preferred embodiment. The motor 12 is preferably an outer rotor type motor. The motor 12 includes a rotating portion 3, and a stationary portion 2. A portion of the stationary portion 2 and a portion of the rotating portion 3 define a fluid dynamic pressure bearing mechanism (hereinafter, referred to as a bearing mechanism 4). The rotating portion 3 is supported to be rotatable about the central axis J1 of the motor 12 with respect to the stationary portion 2 via a lubricant.

The rotating portion 3 preferably includes a rotor hub 32, a rotor magnet 33, and a shaft 31. The rotor hub 32 has a cup shape. The rotor hub 32 preferably includes a disk portion 321, a cylindrical portion 322, and a rotor hub main body portion 323. The disk portion 321 extends from an upper portion of the shaft 31 to a radially outer side. The cylindrical portion 322 extends from an outer edge of the disk portion 321 to a lower side in the axial direction. The rotor hub main body portion 323 is positioned on a further radially outer side than the disk portion 321 and the cylindrical portion 322. The disk 11 illustrated in FIG. 1 is fixed to an outer side surface of the rotor hub main body portion 323. The rotor magnet 33 is mounted on an inner side surface of the rotor hub main body portion 323 and is arranged in the vicinity of the central axis J1.

The stationary portion 2 includes a base portion 21, and a stator 22. A hole portion (not illustrated) is preferably defined at a center of the base portion 21. The stator 22 is mounted on the base portion 21 in the vicinity of the hole portion. In this motor 12, flux in the radial direction is generated in the stator 22 when an electrical drive current is applied to a coil (not illustrated) of the stationary portion 2. Torque in the circumferential direction is generated by an effect of the flux between the stator 22 and the rotor magnet 33.

Figure 3:
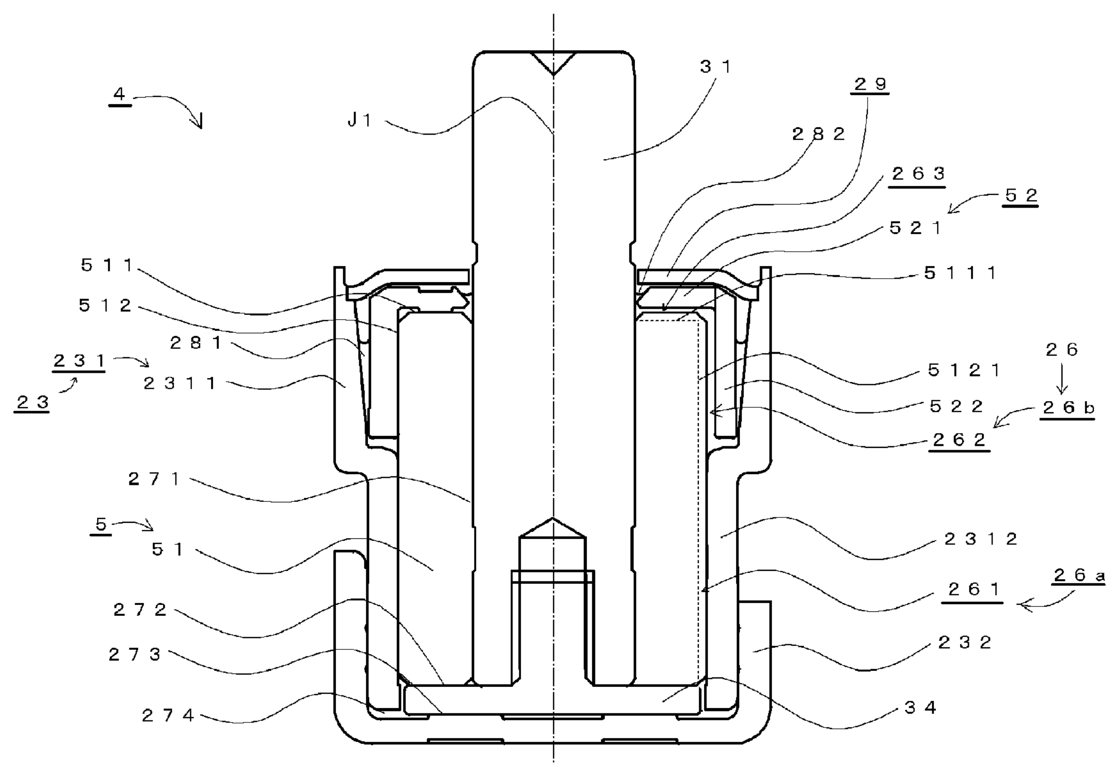
FIG. 3 is a schematic cross-sectional view of a bearing mechanism according to the preferred embodiment of the present invention.

FIG. 3 is a schematic cross-sectional view illustrating the bearing mechanism 4 according to the preferred embodiment of the present invention. The bearing mechanism 4 preferably includes the shaft 31, a sleeve portion 5, a thrust plate 34, a lubricant, and a seal cap 29. The sleeve portion 5 has a cylindrical shape. The thrust plate 34 has a disk shape. The shaft 31 and the thrust plate 34 are portions of the rotating portion 3. The sleeve portion 5 and the seal cap 29 are portions of the stationary portion 2. The bearing mechanism 4 is fixed, for example, to the hole portion of the base portion 21 with a thermosetting adhesive.

The sleeve portion 5 is positioned on the radially outer side of the shaft 31, and has a cylindrical shape. In this embodiment, the sleeve portion 5 preferably includes a sleeve main body 51, and an upper cap portion 52. The sleeve main body 51 includes an inner circumferential surface that defines a hole into which the shaft 31 is inserted. An outer circumferential surface of the shaft 31 faces an inner circumferential surface of the sleeve portion 5 via the lubricant. More specifically, the outer circumferential surface of the shaft 31 faces the inner circumferential surface of the sleeve main body 51 with the lubricant provided therebetween. The upper cap portion 52 preferably includes an innermost circumferential surface that defines a hole into which the shaft 31 is inserted, and covers upper portions of an upper surface 511 of the sleeve main body 51 and an outer circumferential surface of the sleeve main body 51. The upper cap portion 52 preferably includes a plate-shaped or substantially plate-shaped flat plate portion 521 that is positioned on a further radially outer side than the shaft 31 and widens in the radial direction, and a cylindrical portion 522 that extends from an outer end of the flat plate portion 521 to a radially lower side. The flat plate portion 521 preferably includes a through-hole 5211. The through-hole 5211 penetrates the flat plate portion 521 in the axial direction. The flat plate portion 521 faces the upper surface 511 of the sleeve main body 51 in the axial direction. The cylindrical portion 522 faces the outer circumferential surface of the sleeve main body 51 in the radial direction.

A sleeve housing 23 preferably covers at least lower portions of a lower surface of the thrust plate 34 and the outer circumferential surface of the sleeve main body 51. The sleeve housing 23 includes a housing main body 231, and a lower cap portion 232. The housing main body 231 preferably has a cylindrical or substantially cylindrical shape and covers the outer circumferential surface of the sleeve main body 51. The lower cap portion 232 preferably has a cup shape and is positioned in a lower portion of the housing main body 231. In the sleeve housing 23, the lower cap portion 232 is fitted into the housing main body 231 and is fixed thereto through, for example, adhesion. The housing main body 231 has an upper cylindrical portion 2311, and a cylindrical portion 2312. In this preferred embodiment, the upper cylindrical portion 2311 and the cylindrical portion 2312 may be integrated. The upper cylindrical portion 2311 has an inner circumferential surface that defines a first capillary seal portion 281. The cylindrical portion 2312 is preferably positioned on a further lower side in the axial direction than the upper cylindrical portion 2311, and is fixed to the outer circumferential surface of the sleeve main body 51.

The thrust plate 34 is mounted on a lower end of the shaft 31, and faces a lower surface of the sleeve main body 51. As illustrated in FIG. 2, an upper end of the shaft 31 is fixed to the rotating portion 3 such that the shaft 31 can support the rotating portion 3 in the axial direction. As a result, the rotating portion 3 is supported to be rotatable with respect to the stationary portion 2.

The sleeve main body 51 preferably includes a plurality of upper surface grooves 5111 that are arranged on the upper surface 511 and extend in the radial direction from an inner circumference to an outer circumference. In addition, an outer circumferential surface 512 preferably includes a plurality of outer circumferential surface grooves 5121 that extend in a direction which is parallel or substantially parallel with the central axis J1. In this embodiment, the plurality of upper surface grooves 5111 are preferably positioned at regular or substantially regular intervals in the circumferential direction, and the outer circumferential surface grooves 5121 are arranged at the same positions in the circumferential direction as the positions of the upper surface grooves 5111. In other words, an outer end of the upper surface groove 5111 is connected to an upper end of the outer circumferential surface groove 5121 on the upper side in the axial direction. The depth of the upper surface groove 5111 is smaller than the width of a chamfering, which is disposed at an outer edge of the upper surface 511, in the axial direction. The depth of the outer circumferential surface groove 5121 is preferably smaller than the width of a chamfering on an outer edge of the housing main body 231 in the radial direction. The plurality of the upper surface grooves 5111 and the plurality of the outer circumferential surface grooves 5121 are provided in this embodiment. However, the number of the upper surface grooves 5111 and the number of the outer circumferential surface grooves 5121 may be at least one each, without having to be two or more.

Figure 4:
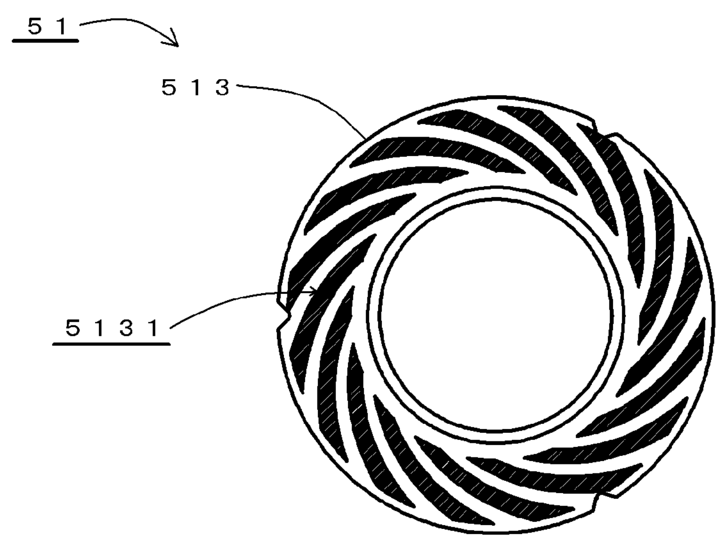
FIG. 4 is a bottom view of a sleeve main body according to the preferred embodiment of the present invention.

FIG. 4 is a bottom view of the sleeve main body 51 of the preferred embodiment. As illustrated in FIG. 4, a lower surface 513 of the sleeve main body 51 has a plurality of spiral-shaped upper thrust dynamic pressure groove arrays 5131. Preferably, the sleeve main body 51 is a porous sintered metal body. For example, the upper surface grooves 5111 and the outer circumferential surface grooves 5121 (illustrated in FIG. 3), and the upper thrust dynamic pressure groove arrays 5131 (illustrated in FIG. 4) are preferably molded by press molding, for example.

The upper surface grooves 5111 and the outer circumferential surface grooves 5121 (illustrated in FIG. 3), and the upper thrust dynamic pressure groove arrays 5131 (illustrated in FIG. 4) may be molded by cutting and electrochemical machining instead of the press molding.

Figure 5:
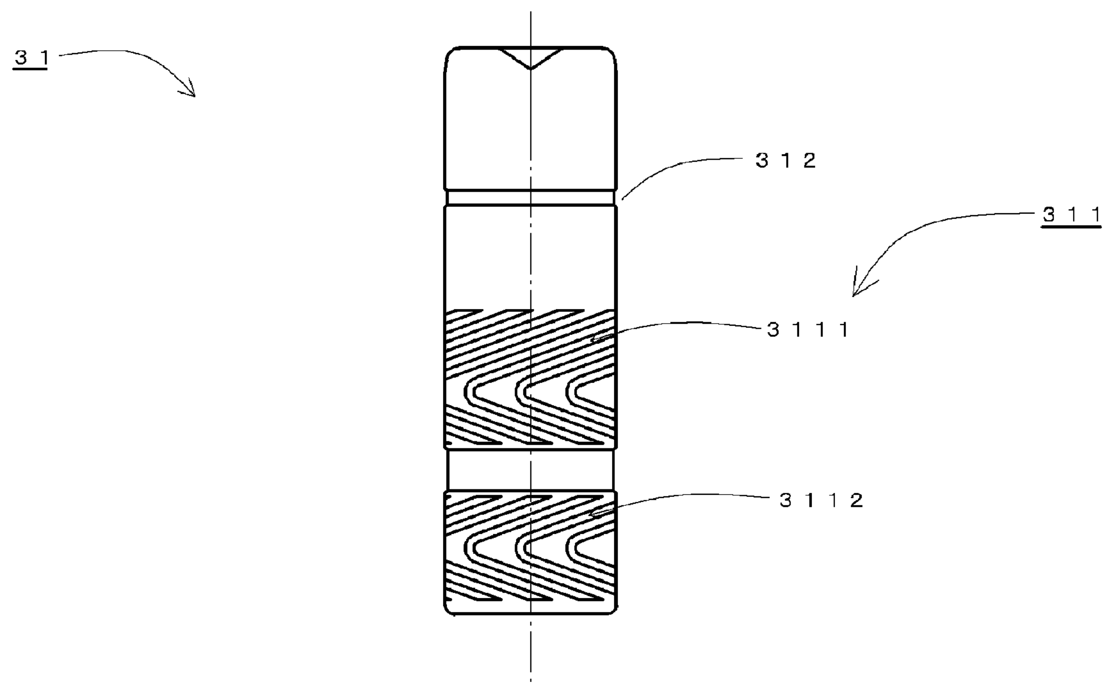
FIG. 5 is a front view of a shaft according to the preferred embodiment of the present invention.

FIG. 5 is a front view of the shaft 31 according to the preferred embodiment. As illustrated in FIG. 5, a pair of radial dynamic pressure groove arrays 311 is preferably disposed on the outer circumferential surface of the shaft 31 in this preferred embodiment. The radial dynamic pressure groove array 311 may be disposed on at least a portion of the outer circumferential surface of the shaft 31 or the inner circumferential surface of the sleeve main body 51. The radial dynamic pressure groove arrays 311 are divided in the axial direction by a plurality of upper side grooves 3111 and a plurality of lower side grooves 3112 and are arranged at two places.

In addition, the shaft 31 preferably includes an annular concave portion 312 that is defined about the central axis J1 above the upper side grooves 3111. When the shaft 31 rotates, the radial dynamic pressure groove array 311 generates radial dynamic pressure in a lubricant in a radial gap 271 (refer to FIG. 3) between an inner side surface of the sleeve portion 5 and itself. In this manner, the shaft 31 is supported in the radial direction, out of contact by the sleeve portion 5, via the lubricant. Each of the upper side grooves 3111 and the lower side grooves 3112 of the radial dynamic pressure groove array 311 has a herringbone shape, a straight line part on an upper side of the upper side groove 3111 is longer than a straight line part on a lower side, and dynamic pressure is generated at the same time as the radial dynamic pressure such that the lubricant is directed downward in the radial gap 271. In the lower side groove 3112, upper and lower straight line portions have the same length, and only the radial dynamic pressure is generated.

Figure 6:
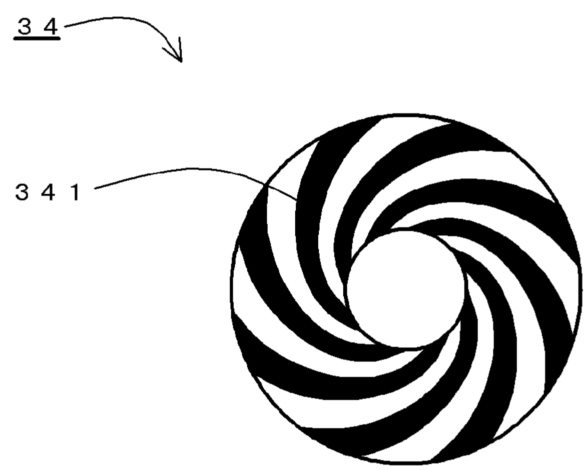
FIG. 6 is a bottom view of a thrust plate according to the preferred embodiment of the present invention.

FIG. 6 is a bottom view of the thrust plate 34. The lower surface of the thrust plate 34 includes a plurality of spiral-shaped lower thrust dynamic pressure groove arrays 341.

As illustrated in FIG. 3, the lubricant flows from the radial gap 271 into a first thrust gap 272 when the shaft 31 and the thrust plate 34 rotate. The lower surface 513 of the sleeve main body 51 and an upper surface of the thrust plate 34 define the first thrust gap 272. In addition, thrust dynamic pressure is generated in the lubricant in the first thrust gap 272 by the upper thrust dynamic pressure groove arrays 5131 (refer to FIG. 4) of the lower surface 513 of the sleeve main body 51.

A second thrust gap 273 is also filled with a lubricant. The thrust plate 34 and the lower cap portion 232 define the second thrust gap 273. Thrust dynamic pressure is generated in the lubricant in the second thrust gap 273 by the lower thrust dynamic pressure groove arrays 341 (refer to FIG. 6) of the thrust plate 34. The shaft 31 is supported in a thrust direction by the thrust dynamic pressure of the first thrust gap 272 and the second thrust gap 273. In addition, a gap 274 that allows the first thrust gap 272 and the second thrust gap 273 to communicate with each other is disposed between an outer circumferential surface of the thrust plate 34 and an inner circumferential surface of the sleeve housing 23. The gap 274 is filled with a lubricant.

As illustrated in FIG. 3, the radial gap 271, the first thrust gap 272, a first flow path 26*a*, and a second flow path 26*b* preferably define a circulation path 26 in the bearing mechanism 4. The first flow path 26*a* has an outer side lower flow path 261. The outer circumferential surface 512 of the sleeve main body 51 and an inner circumferential surface of the cylindrical portion 2312 constitute the outer side lower flow path 261. An outer side upper flow path 262 and an upper side flow path 263 constitute the second flow path 26*b*. The outer circumferential surface 512 of the sleeve main body 51 and an inner circumferential surface of the cylindrical portion 522 constitute the outer side upper flow path 262. An upper surface of the sleeve main body 51 and a lower surface of the flat plate portion 521 constitute the upper side flow path 263.

The circulation path 26 is filled with a lubricant. The lubricant flows in the circulation path 26 when the shaft 31 rotates to generate fluid dynamic pressure. More specifically, the lubricant flows from the first thrust gap 272, which is connected to a lower portion of the radial gap 271 to the outer side lower flow path 261 and the outer side upper flow path 262. Further, the lubricant also flows from the outer side upper flow path 262 to the radial gap 271 through the upper side flow path 263.

As described above, the radial dynamic pressure groove array 311 (refer to FIG. 5) is arranged on the outer circumferential surface of the shaft 31. A site that includes the radial dynamic pressure groove array 311 on the outer circumferential surface of the shaft 31 and an inner side surface of the sleeve main body 51 define a bearing portion (not illustrated). When the motor 12 is driven, the bearing portion can generate radial dynamic pressure in the lubricant. The radial dynamic pressure groove array 311 may be arranged on the inner side surface of the sleeve main body 51 instead of the outer circumferential surface of the shaft 31.

Figure 7:
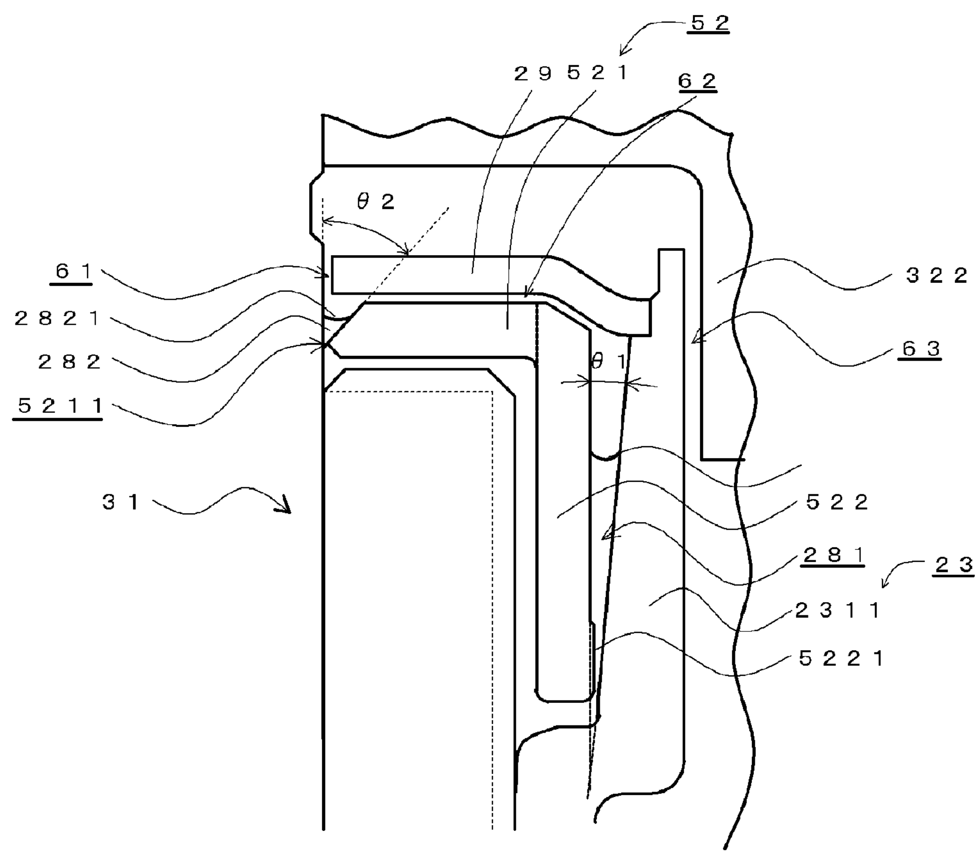
FIG. 7 is a schematic cross-sectional view of the vicinity of an upper cap portion according to the preferred embodiment of the present invention.

FIG. 7 is a view illustrating the vicinity of the upper cap portion 52 of the preferred embodiment. As illustrated in FIG. 7, the stationary portion 2 includes the first capillary seal portion 281. The first capillary seal portion 281 is positioned on a radially outer side of a dynamic pressure bearing portion. In this embodiment, the radial dynamic pressure groove array 311 (refer to FIG. 5) is arranged on the outer circumferential surface of the shaft 31. The first capillary seal portion 281 is positioned on a radially outer side of the radial dynamic pressure groove array 311. The first capillary seal portion 281 is positioned between the sleeve housing 23 and the upper cap portion 52. More specifically, the first capillary seal portion 281 is positioned between the inner circumferential surface of the upper cylindrical portion 2311 and an outer circumferential surface of the cylindrical portion 522.

In this preferred embodiment of the present invention, the width of the first capillary seal portion 281 in the radial direction (dimension between the inner circumferential surface of the upper cylindrical portion 2311 and the outer circumferential surface of the cylindrical portion 522) gradually increases upward. A first liquid surface 2811 is preferably positioned in the first capillary seal portion 281. In this manner, the lubricant is held in the first capillary seal portion 281.

In an upper portion of the first capillary seal portion 281, an oil repellent (not illustrated) is applied to at least one of the inner circumferential surface of the upper cylindrical portion 2311 and the outer circumferential surface of the cylindrical portion 522. In this manner, leakage of the lubricant from the first capillary seal portion 281 is suppressed.

In addition, a lower end portion 5221 of the cylindrical portion 522 protrudes to a further radially outer side than an outer side surface on an upper portion side of the cylindrical portion 522. Accordingly, a gap between the lower end portion 5221 and the inner circumferential surface of the upper cylindrical portion 2311 is small in a lower portion of the first capillary seal portion 281. Accordingly, the lubricant can be held stably in the first capillary seal portion 281.

A second capillary seal portion 282 is preferably positioned on an upper side of the sleeve portion 5 in the axial direction. The second capillary seal portion 282 is positioned on a further radially inner side than the first capillary seal portion 281. An inner circumferential surface of the through-hole 5211 and an outer side surface of the shaft 31 define the second capillary seal portion 282.

More specifically, the second capillary seal portion 282 is positioned on a further upper side in the axial direction than the place where the radial dynamic pressure groove array 311 (refer to FIG. 5) is positioned.

The inner circumferential surface of the through-hole 5211 faces the outer circumferential surface of the shaft 31 via the second capillary seal portion 282. In this preferred embodiment, the width of the second capillary seal portion 282 in the radial direction (i.e., the distance between the inner circumferential surface of the through-hole 5211 and the central axis J1 in the radial direction) gradually increases upward. Preferably, the inner circumferential surface of the through-hole 5211 is an inclined surface that is inclined with respect to the central axis J1. The inner circumferential surface of the through-hole 5211 may alternatively be curved surface, if so desired. A second liquid surface 2821 is defined and the lubricant is held in the second capillary seal portion 282.

An opening angle θ1 of the first capillary seal portion 281 is an angle formed by the inner circumferential surface of the upper cylindrical portion 2311 and the outer circumferential surface of the cylindrical portion 522, and is open toward an upward side. An opening angle θ2 of the second capillary seal portion 282 is an angle defined by an area on a further upper side in the axial direction than an innermost end of the inner circumferential surface which defines the through-hole 5211 of the flat plate portion 521 and the outer side surface of the shaft 31, and is open toward the upward side. The opening angle θ2 of the second capillary seal portion 282 is larger than the opening angle θ1 of the first capillary seal portion 281.

The circulation path 26, the first capillary seal portion 281, and the second capillary seal portion 282 are filled with the lubricant. The first liquid surface 2811 is preferably positioned higher in an axial direction than the second liquid surface 2821. In addition, the length of the first capillary seal portion 281 in the axial direction is preferably larger than that of the second capillary seal portion 282. More specifically, the distance in the axial direction from the site where the lower end portion 5221 faces the upper cylindrical portion 2311 to the seal cap 29 (described later) is longer than the dimension of the inner circumferential surface of the through-hole 5211 in the axial direction.

The stationary portion 2 includes the annular seal cap 29. The seal cap 29 has an inner circumferential surface that defines a hole through which the shaft 31 passes. The seal cap 29 preferably covers at least an upper surface of the sleeve portion 5. In this embodiment, the seal cap 29 covers at least a portion of the opening of the first capillary seal portion 281 and at least a portion of the opening of the second capillary seal portion 282. In this preferred embodiment, the seal cap 29 covers the opening of the first capillary seal portion 281 and covers at least a portion of the opening of the second capillary seal portion 282.

The outer circumferential surface of the shaft 31 and an inner side surface of the hole of the seal cap define a first gap 61. The outer circumferential surface of the shaft 31 faces the inner circumferential surface of the seal cap 29 in the radial direction via the first gap 61. The maximum width of the first gap 61 in the radial direction is smaller than the maximum width of the opening of the first capillary seal portion 281.

A second gap 62, which extends at least in the radial direction, is preferably positioned between the upper surface of the sleeve portion 5 and a lower surface of the seal cap 29. More specifically, an upper surface of the upper cap portion 52 and the lower surface of the seal cap 29 define the second gap 62. In this preferred embodiment, the second gap 62 is a space that annularly widens over an entire circumference. The maximum width of the second gap 62 in the axial direction is smaller than the maximum width of the opening of the first capillary seal portion 281. The second gap 62 communicates with the second capillary seal portion 282. The second gap 62 communicates with the second capillary seal portion 282.

In addition, the maximum width of the second gap in the axial direction is smaller than the plate thickness of the seal cap 29.

The first gap 61 communicates with the second gap 62 via the second capillary seal portion 282. The first capillary seal portion 281 communicates with the second capillary seal portion 282 via the second gap 62. In other words, the first capillary seal portion 281 and the second capillary seal portion 282 communicate with an outside of the motor 12 via the first gap 61 and the second gap 62.

Since the first capillary seal portion 281 and the second capillary seal portion 282 communicate with the outside of the motor 12 via the first gap 61 and the second gap 62, a movement of the lubricant, which evaporates from the first capillary seal portion 281 and the second capillary seal portion 282, outside of the motor 12 via the first gap 61 and the second gap 62 is suppressed or minimized. In other words, the amount of evaporation of the lubricant is reduced, and thus wear resulting from contact between the shaft 31 and the sleeve portion 5 is suppressed or minimized. As a result, the life of the motor 12 is improved.

As described above, the first capillary seal portion 281 and the second capillary seal portion 282 preferably communicate with the outside of the motor 12 via the first gap 61 and the second gap 62. Accordingly, the pressure of the first capillary seal portion 281 and the second capillary seal portion 282 is equal to the pressure outside of the motor 12. In this manner, height variations of the first liquid surface 2811 and the second liquid surface 2821 are suppressed during the rotation of the motor 12. In addition, leakage of the lubricant from the first capillary seal portion 281 and the second capillary seal portion 282 that results from an external impact applied to the motor 12 can be suppressed.

In this preferred embodiment, the seal cap 29 is fixed to an upper end of the housing main body 231 with an adhesive. The seal cap 29 may be fixed to the upper end of the housing main body 231 by press-fitting or may be fixed thereto by using the adhesive and the press-fitting at the same time.

An inner circumferential surface of the cylindrical portion 322 and an outer circumferential surface of the stationary portion 2 preferably define a third gap 63 that widens in the radial direction. More specifically, the inner circumferential surface of the cylindrical portion 322 and an outer circumferential surface of the upper cylindrical portion 2311 of the sleeve housing 23 define the third gap 63 that extends in the radial direction. The maximum width of the third gap 63 in the radial direction is smaller than the maximum width of the first capillary seal portion 281 in the radial direction. When the motor 12 is in a stationary state, the third gap 63 overlaps with the first liquid surface 2811 in the radial direction.

In this manner, a movement of the lubricant, which evaporates from the first capillary seal portion 281 and the second capillary seal portion 282, outside of the motor 12 via the third gap 63 is suppressed or minimized. As such, the amount of evaporation of the lubricant is reduced, and the shaft 31 is stably supported via the lubricant. As a result, the life of the motor 12 is improved.

As illustrated in FIG. 3, the first flow path **26*a* allows the first thrust gap 272 and the first capillary seal portion 281 to communicate with each other. When the shaft 31 rotates, the fluid dynamic pressure is generated to cause the lubricant to flow into the first flow path 26*a* from the first thrust gap 272**.

In addition, the lubricant flows into the second flow path **26*b* from the first flow path 26*a*. The second flow path 26*b* allows the first capillary seal portion 281 and the second capillary seal portion 282** to communicate with each other.

The flow path cross-sectional area of the outer side upper flow path 262 is larger than the flow path cross-sectional area of the first flow path **26*a*. The flow path cross-sectional area of the upper side flow path 263 is larger than the cross-sectional area of the first flow path 26*a*. In other words, the flow path cross-sectional area of the second flow path 26*b* is preferably larger than the cross-sectional area of the first flow path 26*a*. Herein, the flow path cross-sectional area of the outer side upper flow path 262, the upper side flow path 263, and the first flow path 26*a*** is the area of a cross section in a direction perpendicular or substantially perpendicular to the direction in which the lubricant flows.

Since the flow path cross-sectional area of the outer side upper flow path 262 is larger than the flow path cross-sectional area of the first flow path **26*a*, the flow path resistance of the entire second flow path 26*b* is smaller than the flow path resistance of the entire first flow path 26*a*. Accordingly, the lubricant, which flows in from the outer side lower flow path 261, can stably circulate to the outer side upper flow path 262 and the upper side flow path 263**.

In addition, since the flow path cross-sectional area of the second flow path **26*b* is larger than the flow path cross-sectional area of the first flow path 26*a*, a rise in the liquid surface of the lubricant in the first capillary seal portion 281, which results from a rise in the pressure in the first capillary seal portion 281**, is suppressed.

Furthermore, since the rise in the liquid surface of the lubricant in the first capillary seal portion 281 is suppressed, a lowering of the liquid surface of the lubricant in the second capillary seal portion 282 can be suppressed and bubbling in the bearing mechanism 4 can be suppressed.

The embodiment of the present invention has been described hereinabove. However, the present invention is not limited to the above-described embodiment, and various modifications are possible.

Figure 8:
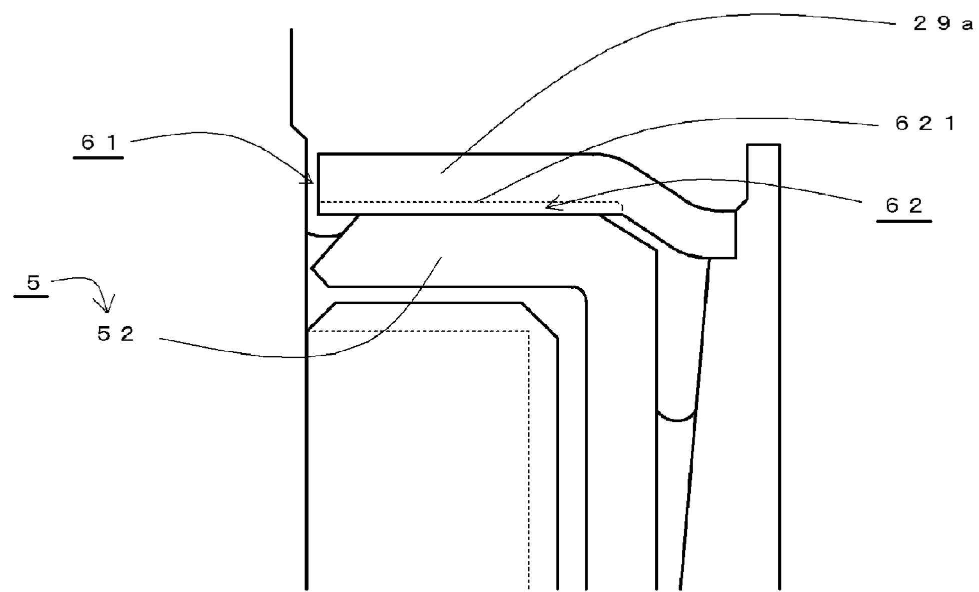
FIG. 8 is a schematic cross-sectional view of the vicinity of an upper cap portion according to a modified preferred embodiment of the present invention.

FIG. 8 is a schematic cross-sectional view of the upper cap portion 52 according to a modified preferred embodiment of the present invention. At least one of the upper surface of the sleeve portion 5 and a lower surface of a seal cap **29*a* includes one or more ribs 621. Each of the ribs 621 protrudes in the axial direction. Preferably, the ribs 621 are arranged at regular intervals in the circumferential direction. Preferably, the rib 621 is in contact with the upper surface of the sleeve portion 5 and the lower surface of the seal cap 29*a*. In the example illustrated in FIG. 8, the rib 621 is disposed on the lower surface of the seal cap 29*a*. The rib 621 extends from an inner edge of a hole of the seal cap 29*a* toward the radially outer side. The rib 621 is in contact with the upper surface of the upper cap portion 52 and the lower surface of the seal cap 29*a***.

The rigidity of the seal cap **29*a* can be increased since the rib 621 is mounted on the lower surface of the seal cap 29*a*. In this manner, the seal cap 29*a* is unlikely to be bent. In addition, the first gap 61 is widened in width in the axial direction by at least the dimension of the rib 621 in the axial direction. Accordingly, the evaporation of the lubricant can preferably be further suppressed or minimized, and the life of the motor 12 can be further improved. Although the rib 621 is disposed on the lower surface of the seal cap 29*a* in this modified preferred embodiment of the present invention, the rib 621 may be disposed on the upper surface of the upper cap portion 52. Also, the number of the ribs 621** may be two or more.

Figure 9:
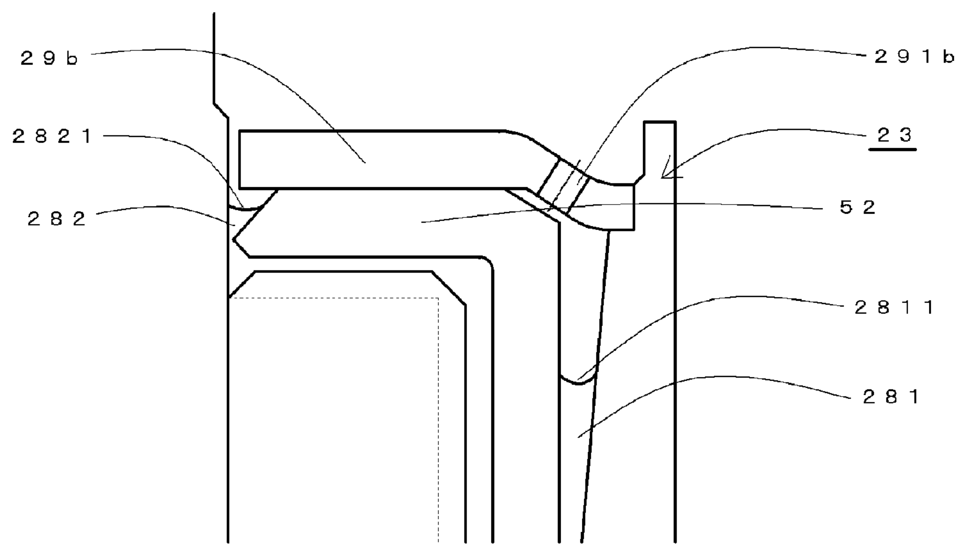
FIG. 9 is a schematic cross-sectional view of the vicinity of an upper cap portion according to another modified preferred embodiment of the present invention.

FIG. 9 is a schematic cross-sectional view of the vicinity of the upper cap portion 52 according to another modified preferred embodiment of the present invention. In FIG. 9, the upper surface of the upper cap portion 52 is in preferably contact with a lower surface of a seal cap **29*b* over an entire circumference. In other words, the second gap 62 is absent. The seal cap 29*b* preferably includes a through-hole 291*b* that penetrates the seal cap 29*b*** in a thickness direction thereof.

Since the seal cap **29*b* has the through-hole 291*b* that penetrates the seal cap 29*b* in the thickness direction thereof, the pressure in the first capillary seal portion 281 and the pressure in the second capillary seal portion 282 are equal to the pressure out of the motor 12. Accordingly, the height variations of the first liquid surface 2811 and the second liquid surface 2821 during the rotation of the motor 12 and the leakage of the lubricant from the first capillary seal portion 281 and the second capillary seal portion 282 that results from the external impact in the stationary state of the motor 12** can be suppressed.

The through-hole **291*b* may be disposed in the sleeve housing 23, if so desired. In this case, an opening of the through-hole 291*b* on the radially inner side is open to an area on a further upper side in the axial direction than the first liquid surface 2811 and an area on a further lower side than the lower surface of the seal cap 29***b*. The through-hole 291*b* may penetrate the seal cap 29*b* in the radial direction, and the through-hole 291*b* may be inclined upward or downward toward the radially outer side.

Figure 10:
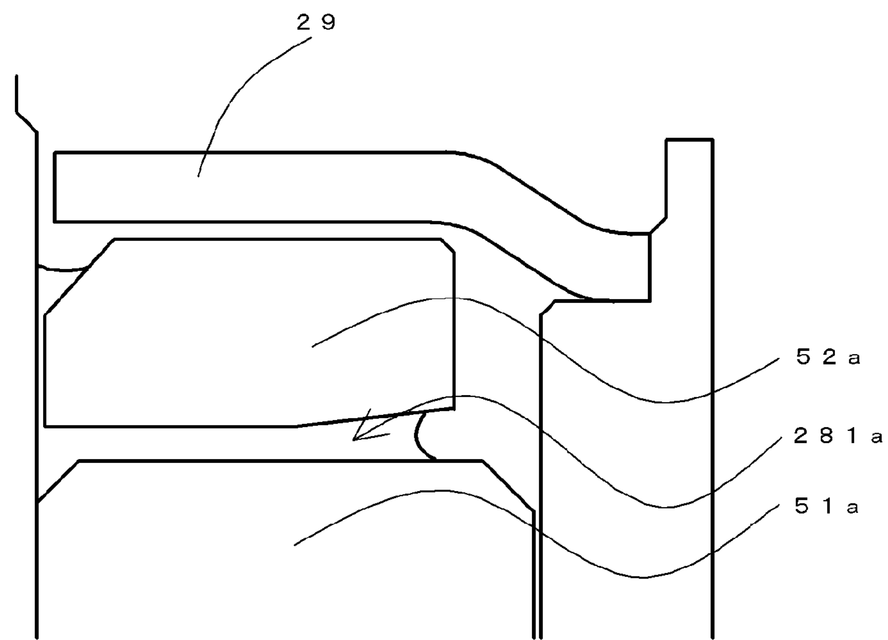
FIG. 10 is a schematic cross-sectional view of the vicinity of an upper cap portion according to yet another modified preferred embodiment of the present invention.

FIG. 10 is a schematic cross-sectional view of the vicinity of an upper cap portion 52*a* according to yet another modified preferred embodiment of the present invention. In FIG. 10, a lower surface of the upper cap portion 52*a* and an upper surface of a sleeve main body 51*a* define a first capillary seal portion 281*a*. In addition, the width of the first capillary seal portion 281*a* in the axial direction gradually increases outward in the radial direction.

More specifically, an inclined surface is arranged at a site of the lower surface of the upper cap portion 52*a* on the radially outer side. The distance in the radial direction between the inclined surface of the upper cap portion 52*a* and the central axis J1 gradually increases toward the upper side in the axial direction. The upper surface of the sleeve main body 51*a* is parallel or substantially parallel with the direction that is perpendicular to the central axis J1. Accordingly, the distance between the inclined surface of the upper cap portion 52*a* and the sleeve main body 51*a* gradually increases toward the radially outer side.

The inclined surface of the upper cap portion 52*a* may be a curved surface and is not particularly limited. In addition, the inclined surface may be inclined over an outer side from the radially inner side of the upper cap portion 52*a*. In addition, the lower surface of the upper cap portion 52*a* may be parallel or substantially parallel with the direction that is perpendicular to the central axis J1, and the inclined surface or the curved surface may be disposed on the upper surface of the sleeve main body 51*a*. In addition, the inclined surface or the curved surface may be disposed on both the lower surface of the upper cap portion 52*a* and the upper surface of the sleeve main body 51*a*, if so desired.

A first liquid surface 2811*a* is positioned and a lubricant is held in the first capillary seal portion 281*a*.

In addition, the first capillary seal portion 281 may be, for example, open downward instead of being open upward or toward the radial direction.

In the radial gap 271 in FIG. 3, the radial dynamic pressure groove array 311 may be disposed on the inner side surface of the sleeve main body 51 instead of the outer side surface of the shaft 31. In addition, the radial dynamic pressure groove array 311 may be disposed on both the outer side surface of the shaft 31 and the inner side surface of the sleeve main body 51. In the first thrust gap 272, the upper thrust dynamic pressure groove array 5131 may be disposed on the upper surface of the thrust plate 34 instead of the lower surface 513 of the sleeve main body 51. In addition, the upper thrust dynamic pressure groove array 5131 may be disposed on both the lower surface 513 of the sleeve main body 51 and the upper surface of the thrust plate 34. In the second thrust gap 273, the lower thrust dynamic pressure groove array 341 may be disposed on an upper surface of the lower cap portion 232 that faces the lower surface of the thrust plate 34 instead of the lower surface of the thrust plate 34. In addition, the lower thrust dynamic pressure groove array 341 may be disposed on both the lower surface of the thrust plate 34 and the lower surface of the thrust plate 34 of the lower cap portion 232.

In FIG. 3, the thrust plate 34 is preferably mounted on the lower end of the shaft 31. However, the thrust plate 34 may alternatively be provided together with the shaft 31 as a single monolithic member.

The sleeve housing 23 illustrated in FIG. 3 may be a member separate from the lower cap portion 232, or may be integrated therewith to have a bottomed cylindrical shape. Furthermore, the upper cap portion 52 and the sleeve housing 23 may have various shapes. Even in this case, it is desirable that at least the lower portions of the lower surface of the sleeve portion 5 and the outer circumferential surface 512 be covered by the sleeve housing 23.

The motor 12 in FIG. 1 is not limited to the outer rotor type motor, and may alternatively be an inner rotor type motor.

In addition, the motor 12 may not be configured to have the radial dynamic pressure groove array 311. The motor 12 may be instead be configured to have only at least one of the upper thrust dynamic pressure groove array 5131 and the lower thrust dynamic pressure groove array 341.

In addition, the thrust dynamic pressure bearing and the radial dynamic pressure bearing are used as the bearing in the preferred embodiment described above, but the type of the bearing is not limited thereto. For example, a conical dynamic pressure bearing may be used as the bearing instead of the thrust dynamic pressure bearing and the radial dynamic pressure bearing.

The preferred embodiments of the present invention and modifications thereof are applicable to spindle motors and disk drive apparatuses.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A spindle motor comprising:

a stationary portion that includes a stator; and a rotating portion that includes a rotor magnet and is rotatably supported via a lubricant by the stationary portion, wherein the stationary portion further includes a sleeve portion that is positioned on a radially outer side of a shaft, and a seal cap that includes an inner circumferential surface which defines a hole through which the shaft passes and covers at least an upper surface of the sleeve portion, the rotating portion further includes a shaft, an outer circumferential surface of the shaft and an inner circumferential surface of the sleeve portion face each other with the lubricant arranged therebetween, and at least a portion of the outer circumferential surface of the shaft or the inner circumferential surface of the sleeve portion defines a bearing portion, the stationary portion further includes a first capillary seal portion that is positioned on a radially outer side of the bearing portion, and a second capillary seal portion that is positioned on a further upper side than the bearing portion and on a further radially inner side than the first capillary seal portion, the lubricant is continuously interposed in the bearing portion, the first capillary seal portion, and the second capillary seal portion, the seal cap covers a portion of an opening of the first capillary seal portion and a portion of an opening of the second capillary seal portion, wherein a maximum width of a first gap between the outer circumferential surface of the shaft and the inner circumferential surface of the seal cap in a radial direction is smaller than a maximum width of the opening of the first capillary seal portion, and a maximum width of a second gap between the upper surface of the sleeve portion and a lower surface of the seal cap in an axial direction is smaller than a maximum width of the opening of the first capillary seal portion.

2. The spindle motor according to claim 1, wherein a maximum width of a gap between the upper surface of the sleeve portion and the lower surface of the seal cap in the axial direction is smaller than a maximum width of the seal cap in the axial direction.

3. The spindle motor according to claim 1, wherein the first capillary seal portion communicates with the second capillary seal portion via the second gap between the upper surface of the sleeve portion and the lower surface of the seal cap.

4. The spindle motor according to claim 3, wherein the second gap includes a rib, which is in contact with the upper surface of the sleeve portion and the lower surface of the seal cap, on at least one of the upper surface of the sleeve portion and the lower surface of the seal cap.

5. The spindle motor according to claim 3, wherein the second gap includes a contact area that is in contact with the upper surface of the sleeve portion and the lower surface of the seal cap, and the seal cap or the sleeve portion includes a through-hole.

6. The spindle motor according to claim 3, wherein the second gap widens in an annular direction.

7. The spindle motor according to claim 1, wherein the sleeve portion includes:

a sleeve main body with a cylindrical shape that includes a hole through which the shaft is inserted; and an upper cap portion that includes an innermost circumferential surface which defines a hole through which the shaft is inserted, and covers upper portions of an upper surface of the sleeve main body and an outer circumferential surface of the sleeve main body; and the innermost circumferential surface of the upper cap portion faces the outer circumferential surface of the shaft via the second capillary seal portion.

8. The spindle motor according to claim 7, wherein the first capillary seal portion communicates with the second capillary seal portion via the second gap between an upper surface of the upper cap portion and the lower surface of the seal cap.

9. The spindle motor according to claim 7, wherein the second gap includes a rib, which is in contact with the upper surface of the sleeve portion and the lower surface of the seal cap, on at least one of the upper surface of the sleeve portion and the lower surface of the seal cap.

10. The spindle motor according to claim 7, wherein the second gap includes a contact area that is in contact with the upper surface of the sleeve portion and the lower surface of the seal cap, and the seal cap or the sleeve portion includes a through-hole.

11. The spindle motor according to claim 7, wherein the second gap widens in an annular direction.

12. The spindle motor according to claim 1, wherein the rotating portion further includes:

a disk portion that extends from an upper portion of the shaft to the radially outer side; and a cylindrical portion that extends from an outer edge of the disk portion to a lower side in the axial direction; and wherein a maximum width of a third gap between an inner circumferential surface of the cylindrical portion and an outer circumferential surface of the stationary portion in the radial direction is smaller than a maximum width of the first capillary seal portion in the radial direction.

13. The spindle motor according to claim 11, wherein a first liquid surface is provided in the first capillary seal portion; and a third gap overlaps with the first liquid surface in a stationary state in the radial direction.

14. The spindle motor according to claim 1, wherein the sleeve portion includes a sleeve main body with a cylindrical shape that includes a hole through which the shaft is inserted, the stationary portion further includes a sleeve housing that covers at least a lower portion of an outer circumferential surface of the sleeve main body, and the sleeve housing faces the sleeve portion with the first capillary seal portion arranged therebetween.

15. The spindle motor according to claim 14, wherein the rotating portion further includes:

a disk portion that extends from an upper portion of the shaft to the radially outer side; and a cylindrical portion that extends from an outer edge of the disk portion to a lower side in the axial direction, and a maximum width of a third gap between an inner circumferential surface of the cylindrical portion and an outer circumferential surface of the sleeve housing in the radial direction is smaller than a maximum width of the first capillary seal portion in the radial direction.

16. The spindle motor according to claim 15, wherein a first liquid surface is provided in the first capillary seal portion, and wherein the third gap overlaps with the first liquid surface in a stationary state in the radial direction.

17. The spindle motor according to claim 1, wherein a first liquid surface is arranged in the first capillary seal portion, a second liquid surface is arranged in the second capillary seal portion, and the first liquid surface is positioned higher in an axial direction than the second liquid surface.

18. The spindle motor according to claim 1, wherein gaps of the first capillary seal portion and the second capillary seal portion in the radial direction widen upward in the axial direction.

19. The spindle motor according to claim 1, wherein a gap of the first capillary seal portion in the axial direction widens outward in the radial direction.

20. The spindle motor according to claim 1, wherein the first capillary seal portion is longer in length in the axial direction than the second capillary seal portion.

21. The spindle motor according to claim 1, wherein an opening angle of the second capillary seal portion is larger than an opening angle of the first capillary seal portion.

22. The spindle motor according to claim 1, further comprising a first flow path through which the lubricant flows into the bearing portion when the spindle motor rotates, the first flow path allowing the gap between the outer circumferential surface of the shaft and the inner circumferential surface of the sleeve portion and the first capillary seal portion to be connected with each other.

23. The spindle motor according to claim 22, further comprising a second flow path into which the lubricant flows from the first flow path, the second flow path allowing the first capillary seal portion and the second capillary seal portion to communicate with each other, wherein a cross-sectional area of the second flow path is larger than a cross-sectional area of the first flow path.

24. The spindle motor according to claim 22, further comprising a second flow path into which the lubricant flows from the first flow path, the second flow path allowing the first capillary seal portion and the second capillary seal portion to communicate with each other, wherein a flow path resistance of the second flow path is smaller than a flow path resistance of the first flow path.

25. A disk drive apparatus comprising:

the spindle motor according to claim 1 that rotates a disk;

an access unit that performs at least one of information reading and information writing on the disk; and a housing that accommodates the disk, the spindle motor, and the access unit.

* * * * *